(12) United States Patent
Neidhart et al.

(10) Patent No.: US 10,506,308 B1
(45) Date of Patent: Dec. 10, 2019

(54) CLOSED VESSEL MONITORING

(71) Applicant: B. United International Inc., Redding, CT (US)

(72) Inventors: Ben Neidhart, Redding, CT (US); Dave Linari, Redding, CT (US); Matthias Neidhart, Redding, CT (US)

(73) Assignee: B. United International Inc., Redding, CT (US)

( * ) Notice: Subject to any disclaimer, the term of this patent is extended or adjusted under 35 U.S.C. 154(b) by 0 days.

(21) Appl. No.: 16/052,225

(22) Filed: Aug. 1, 2018

(51) Int. Cl.
| | |
|---|---|
| *H04Q 9/00* | (2006.01) |
| *G05B 19/07* | (2006.01) |
| *C12C 11/00* | (2006.01) |
| G06Q 20/20 | (2012.01) |
| G06Q 10/08 | (2012.01) |
| H04W 12/02 | (2009.01) |

(52) U.S. Cl.
CPC ............ *H04Q 9/00* (2013.01); *C12C 11/003* (2013.01); *G05B 19/07* (2013.01); *G06Q 10/087* (2013.01); *G06Q 20/203* (2013.01); *H04Q 2209/40* (2013.01); *H04W 12/02* (2013.01)

(58) Field of Classification Search
CPC .... H04Q 9/00; H04Q 2209/40; C12C 11/003; G05B 19/07; G06Q 10/087; G06Q 20/203; H04W 12/02
See application file for complete search history.

(56) References Cited

U.S. PATENT DOCUMENTS

| | | | | |
|---|---|---|---|---|
| 2004/0101606 | A1* | 5/2004 | Ling | A23B 7/148 426/419 |
| 2004/0144258 | A1* | 7/2004 | Kobayashi | A47J 27/0817 99/331 |
| 2009/0057347 | A1* | 3/2009 | Leys | B65D 83/0055 222/386.5 |
| 2014/0110018 | A1* | 4/2014 | Scarvelli | B67D 3/0032 141/64 |
| 2016/0201018 | A1* | 7/2016 | Watson | C12C 13/10 426/11 |
| 2016/0264394 | A1* | 9/2016 | Hershberger | B67D 1/0801 |
| 2017/0215632 | A1* | 8/2017 | Tinkler | A47J 31/407 |
| 2017/0260037 | A1* | 9/2017 | Dalton | B67D 1/1252 |
| 2018/0257067 | A1* | 9/2018 | Kang | B01J 3/02 |

* cited by examiner

*Primary Examiner* — Amine Benlagsir
(74) *Attorney, Agent, or Firm* — Heslin Rothenberg Farley & Mesiti P.C.; Rachel L. Pearlman, Esq.

(57) ABSTRACT

A monitoring device and a method for using the device include a device with connection components coupling a temperature sensor and a pressure sensor to a closed vessel (measuring the values within head space of the closed vessel) and fermenting liquid is stored in the closed vessel. The device includes a monitoring unit coupled to the connection components. This unit includes the temperature sensor and the pressure sensor, which are coupled to a programmable circuit board comprising a transmitter, where the programmable circuit board stores instructions for execution by a processing circuit of the programmable circuit board. The processing circuit obtains from the temperature sensor, via the connection components, the temperature value and from the pressure sensor, via the connection components, the pressure value. The processing circuit transmits, over a wireless communications connection, the temperature value and the pressure value to a receiver communicatively coupled to a computing resource.

18 Claims, 12 Drawing Sheets

CLOSED VESSEL MONITORING

BACKGROUND OF INVENTION

Monitoring systems, including wireless keg management and monitoring systems are utilized to measure the contents of open kegs in order to determine whether product is being properly served by servers. In an open keg, the components of a monitoring system are integrated into a tapped (open) keg and the monitor allows the determination of the percentage of ounces poured, the pressure, the temperature, the cleanliness of the line used to serve the beverage from the keg. Given that the primary purpose of these systems is to monitor the ounces poured, to prevent loss, these management systems may also integrate with a point of sale system, allowing the establishment serving the contents of the keg to reconcile the contents with the sales records. However, the ability to utilize these systems depend on the kegs being open, so that the keg contents can be monitored as they are served. Thus, current monitoring systems are limited to open kegs and cannot be utilized to provide insight into conditions, such as quality of contents and fermentation monitoring, within a closed keg. Insight into the contents of a keg is desirable

SUMMARY OF INVENTION

Shortcomings of the prior art are also overcome and additional advantages are provided through the provision of a device for measuring carbonation in a closed vessel. The device includes: connection components coupling a temperature sensor and a pressure sensor to a closed vessel, wherein the temperature sensor measures a temperature value and the pressure sensor measures a pressure value within head space of the closed vessel, wherein a fermenting liquid is stored in the closed vessel; a monitoring unit coupled to the connection components, the monitoring unit comprising the temperature sensor and the pressure sensor, wherein the temperature sensor and the pressure sensor are coupled to a programmable circuit board comprising a transmitter, wherein the programmable circuit board stores instructions for execution by a processing circuit of the programmable circuit board, for performing a method comprising: obtaining, by the processing circuit, from the temperature sensor, via the connection components, the temperature value; obtaining, by the processing circuit, from the pressure sensor, via the connection components, the pressure value; and transmitting, by the processing circuit, over a wireless communications connection, the temperature value and the pressure value to a receiver communicatively coupled to a computing resource.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Figure 1:
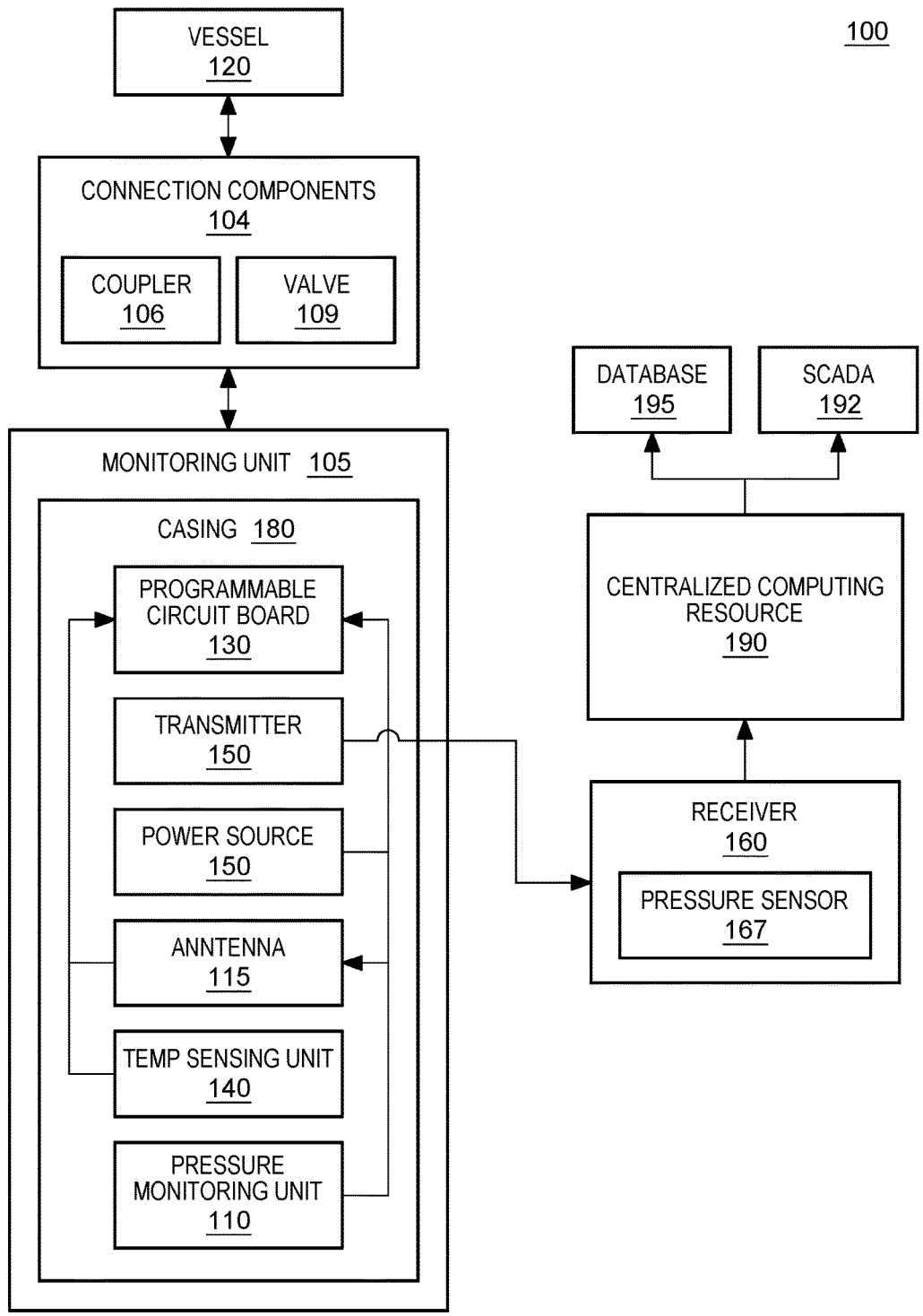
FIG. 1 depicts a combined high-level overview of certain technical aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, a field programmable gate array (FPGA) and a GPU (graphics professor unit). Additionally, items denoted as processors may include hardware and/or software processors or other processing means, including but not limited to a software defined radio and/or custom hardware.

The present invention may be understood as a closed vessel monitoring system and method and embodiments of the present invention provide a computer-implemented method, a computer program product, a computer system, and a device, where program code executed on at least one processing device monitors temperature and pressure, communicating the data collected over a wireless network, by monitoring these aspects in a closed vessel, utilizing a pressure and temperature sensing unit. The vessel may comprise a keg and the example of a keg is utilized throughout to illustrate the temperature and pressure monitoring capabilities of embodiments of the present invention.

Embodiments of the present invention provide advantages over existing wireless monitoring systems utilized with kegs. Existing monitoring systems are open (draft) monitoring systems, where the vessel (e.g., keg) being monitored in order to monitor servings from the keg. Embodiments of the present invention include the use of a closed vessel pressure and temperature sensing unit. Thus, in a closed vessel, embodiments of the present invention measure ambient temperature and pressure within the head space of the closed vessel (e.g., keg) in order to estimate the amount of carbon dioxide dissolved in the liquid, which provides carbonation levels or fermentation progress in the liquid. Unlike existing monitoring, which are limited to providing users with data regarding how much product (e.g., beer) is being poured during a timed event, to ensure product is not given away, resulting in lost profits, embodiments of the present invention monitor the quality of a product in a closed vessel, allowing users of the system to ensure the quality of product in a keg is within an acceptable range before providing the keg to a consumer (e.g., restaurant) for serving. Embodiments of the present invention provide quality control monitoring by utilizing pressure and temperature measures to monitor fermentation.

As will be discussed herein, embodiments of the present invention determine a level of carbon dioxide in a sealed vessel (e.g., keg) of beer. Monitoring the carbon dioxide level in a sealed keg provides data that alerts a user to the quality of the beer because: 1) the carbon dioxide level indicates when secondary fermentation is complete; and 2) the carbon dioxide level can indicate if after secondary fermentation, while the beer is maturing in a warehouse or warm room, the beer/liquid has continued to carbonate to the point of over-carbonation. Regarding the first aspect, knowing when the secondary carbonation is complete, indicates to a user of an embodiment of the present invention that the carbonation levels are at a level where the product can be released to the market for sale. Embodiments of the present invention allow users to provide product with consistent carbonation levels, while "keg conditioning" the product (not using forced carbonation). Embodiments of the present invention provide carbon dioxide levels wirelessly and instantaneously. Embodiments of the present invention are self-contained, thus, no external machine is needed with nitrogen canisters, etc. Regarding the second aspect, after secondary carbonation has completed, the contents of a keg may continue to carbonate due to wild yeast fermenting the residual sugars or cellulose. This may occur when beer, for example, is maturing in a warehouse, conditioning room or warm room, the beer/liquid continues to carbonate and may over carbonate due to wild yeast fermenting the residual sugars or cellulose if dealing with wild yeast strains, including but not limited to, brettanomyces strains. Monitoring the contents of the kegs utilizing embodiments of the present invention is important to ensuring the quality of the product because over carbonation can lead to un-pourable beer, and unsatisfactory product, or safety concerns, due to coupler/hose malfunctions, if sent out to the market.

Embodiments of the present invention, a closed vessel monitoring system, include a monitoring device that includes units that measure temperature and pressure of a closed vessel and provide that data to external computing resources. In embodiments of the present invention, devices that are part of this system that measure temperature and pressure, share air space within a keg to measure the pressure within the head space of the closed vessel. The monitoring device(s) monitors ambient temperature, as the vessel will be the same temp as the electronic sensor, provided that are within a few inches of each other. Program code executing on a processing device receives the temperature and pressure measurements and utilizes these measurements to calculate (e.g., estimate) the amount of carbon dioxide dissolved in the liquid in the vessel. The amount of carbon dioxide indicates the carbonation level and/or fermentation progress in the liquid that is within the closed vessel. Equation 1 below is an example of a calculation performed by an embodiment of the present invention to determent the carbonation of the liquid in the vessel, based on temperature and pressure values obtained via the monitoring.

$$\text{carb}(g/l) = (\text{pressure in BAR} + 1.013) * (2.71828182845904\char`\^(-10.73797 + (2617.25/(\text{tempC} + 273.15)))) * 1010.73797 + (2617.25/(\text{temperatureC} + 273.15)))) * 10. \quad \text{(Equation 1)}$$

Figure 7:
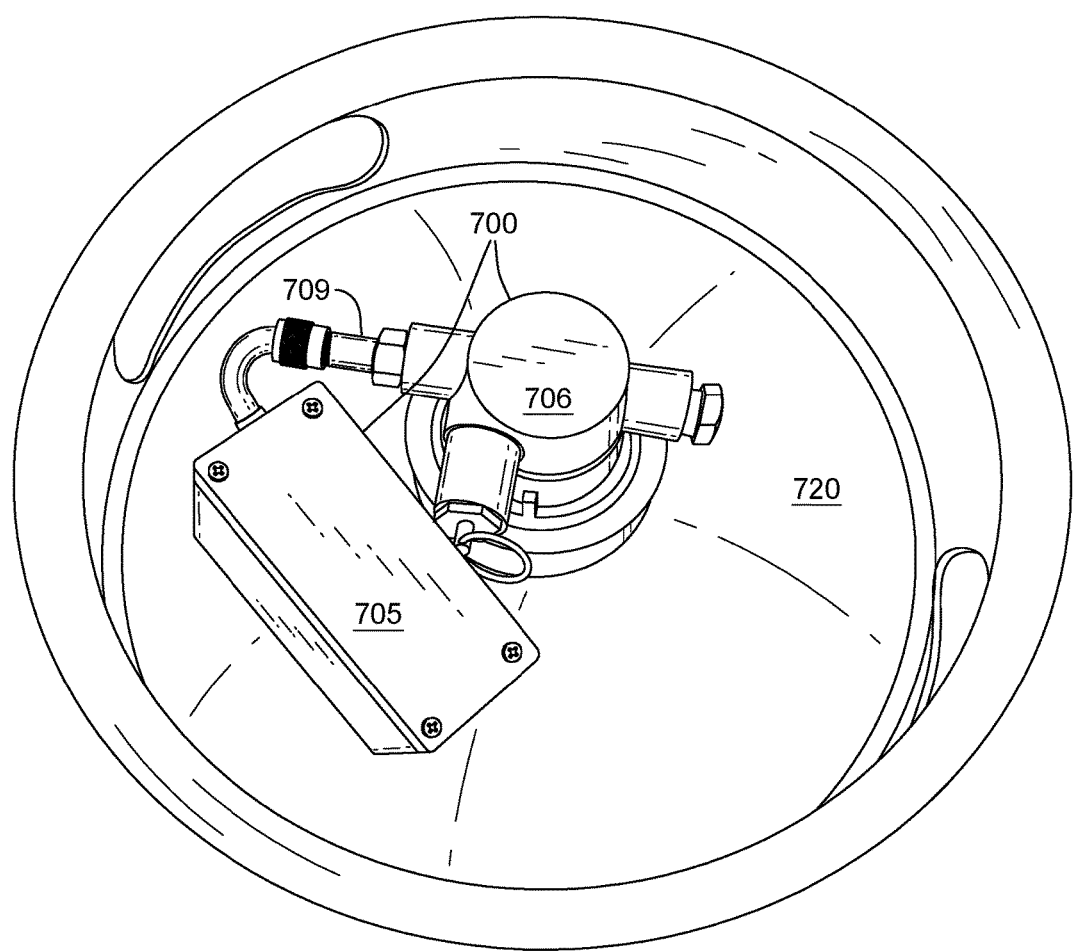
FIG. 7 depicts certain aspects of an embodiment of the present invention.
Figure 8:
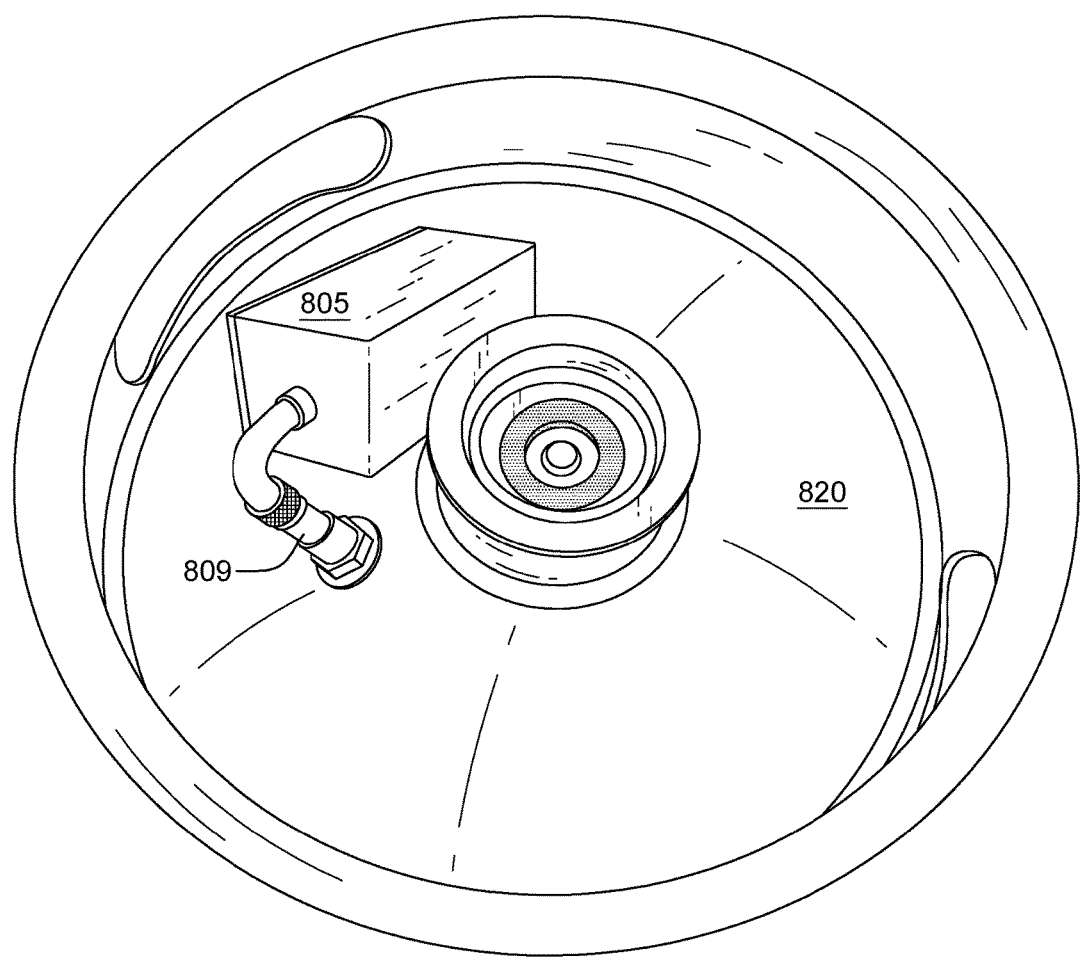
FIG. 8 depicts certain aspects of an embodiment of the present invention.

FIG. 1 is a diagram a closed vessel monitoring system 100 of that present invention. The system 100 includes components that practice various aspects of the system 100. In general, a closed vessel monitoring system 100 can be understood as three groups of components: 1) the components utilized to couple electronics, including a transmitter, encased in a unit to a keg; 2) the encased electronic unit, referred to herein as a monitoring unit; and 3) a receiver coupled to a computing resource, to receive data wirelessly from the transmitter and provide the data to the computing resource. FIG. 7 and FIG. 8, which are discussed herein, provide a view of the monitoring unit and the components utilized to couple the monitoring unit to either a sanke keg (e.g., FIG. 7), or a modified keg (e.g., FIG. 8).

Rather than illustrating the specifics of various components of embodiments of the present invention, FIG. 1 provides a block diagram that focuses on the interconnectivity of the components, rather than the appearance. FIG. 1 includes each of the three groupings of components: the connection components 104, the monitoring unit 105, and the receiver 160, which is communicatively coupled to a centralized computing resource 190. In embodiments of the present invention, multiple monitoring units 105 may communicate date to a single receiver 106.

The components of the embodiment of FIG. 1 that are in the first group, connection components 104, are a coupler 106 and a Schrader valve 109. The components of the embodiment of FIG. 1 that are in the second group, the monitoring unit 105 (coupled by the connection components to a vessel 120 (i.e., a closed vessel being monitored by the pressure monitoring unit 110 and the temperature sensing unit 140), are the pressure monitoring unit 110, the temperature sensing unit 140, a programmable circuit board 130 executing program code (which can be both firmware and/or software), a transmitter 150, a power source 170, and the casing 180, into which these electronic are placed (e.g., sealed, enclosed). For ease of understanding, these components are referred herein, collectively, as a monitoring unit 105. The receiver 160 comprises the third group and is communicatively couples to a centralized computing system 190, e.g., through a USB port. In embodiments of the present invention, a closed vessel monitoring system 100 is coupled to a vessel 120 (e.g., keg, can, bottle) containing a carbonated fermenting beverage (e.g., beer, hard cider, a naturally carbonated beverage, etc.).

Figure 3:
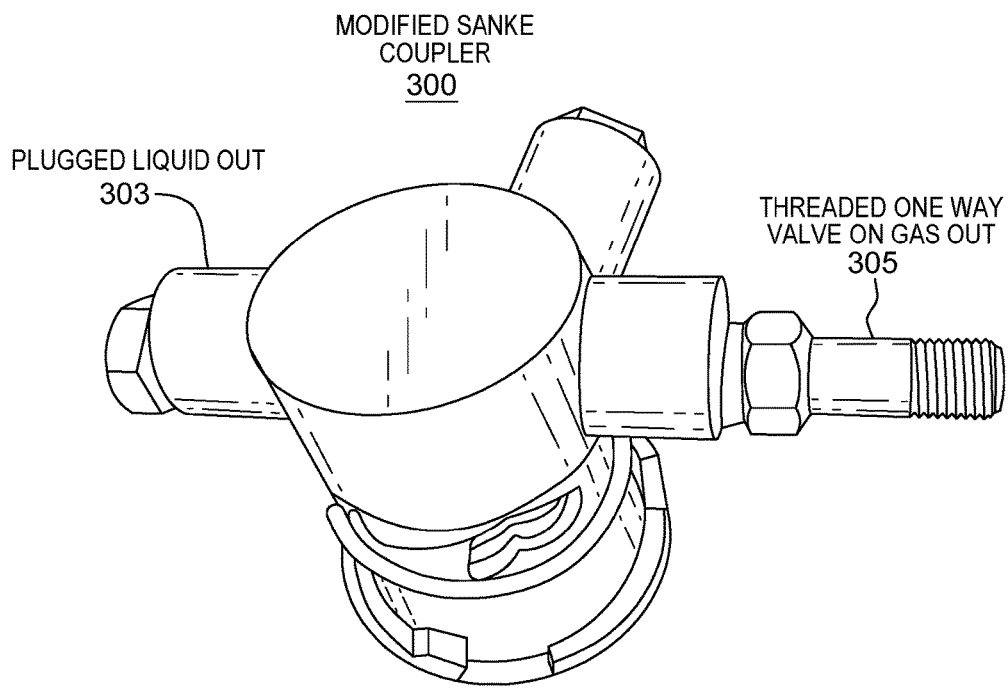
FIG. 3 is an example of a modified keg coupled to certain aspects of some embodiments of the present invention.

Aspects of various embodiments of the present invention can be modified to work with any coupler system. However, in order to illustrate certain non-limiting examples, some of the figures herein illustrate aspects of some embodiments of the present invention as applies to sanke and modified kegs and utilizing coupling elements including a sanke keg couple and a Schrader valve. As understood by one of skill in the art, these illustration and accompanying descriptions are offered as non-limiting examples. In some embodiments of the present invention, the monitoring unit 105 is coupled to the vessel 120 (e.g., a sanke keg or a modified keg) with the connection components 104. If the vessel is a sanke keg, the monitoring unit 105 can be coupled to the vessel 120 utilizing a sanke keg coupler 106 and a Schrader valve 109. As understood by one of skill in the art, a Schrader valve 109 consists of an externally threaded hollow cylindrical metal tube of a material including but not limited to, stainless steel. In the center of the exterior end is a metal pin pointing along the axis of the valve stem. The pin's end is approximately flush with the end of the valve body. A connection to a modified keg can also utilize a Schrader valve 109. Although a Schrader valve 109 is one example of a valve that can be utilized as a connector in certain embodiments of the present invention and is selected because Schrader valves 109 that do not allow pressure to escape unless the valve is depressed. Another advantage in using a Schrader valves 109 is that a Schrader valves 109 will fail in a closed position, so if this valve fails, all the carbon dioxide and liquid in the vessel 120 will not be released. Thus, further embodiments of the present invention can utilize different types of valves as connection components 104 provided that these valves have safeguards that prevent pressure from escaping from the vessel 120. FIG. 3 is an example of a modified keg 300 and depicts a one-way valve (e.g., a Schrader valve).

FIG. 3 depicts certain aspects of a sanke keg coupler 302 utilized in the closed vessel monitoring device 300 of an embodiment of the present invention. As illustrated in FIG. 3, a Schrader valve 305 (a threaded one way valve) provides a single direction of egress for gas, while the other end of the sanke coupler 307, the liquid end, 303, is plugged.

Returning to FIG. 1, the monitoring unit 105 aspects of embodiments of the present invention includes a programmable circuit board 130, including but not limited to a printed circuit board (PCB), and/or a field-programmable gate array (FPGA), which may include a mounted microcontroller or microprocessor, communicatively coupled to the pressure measuring unit 110 and the temperature sensing unit 140. In some embodiments of the present invention, the temperature sensing unit 140 and the pressure measuring unit 110 are a combined barometric pressure and temperature sensor. Additionally communicatively coupled to the programmable circuit board 130 is a transmitter 150, such as a radio transmitter, which utilizes an antenna 115, and a power source 170. In some embodiments of the present invention, the transmitter 150 is a radio transmitter which transmits up to five hundred (500) meters in a line of sight. In some embodiments of the present invention, the transmitter 150 is a long range radio transmitter with capabilities of transmitting two (2) kilometers. The transmitter 150 utilized is balanced with the power demands from the power source 170. For ease of use, the power source 170 can be replaceable and/or rechargeable, such as a battery.

When a battery is utilized as a power source 170, to save on the battery life, the program code executing on the programmable circuit board 130 puts the programmable circuit board 130 into a sleep mode between obtaining temperature and pressure readings from the temperature sensing unit 140 and the pressure measuring unit 110. The program code obtains the readings at pre-defined intervals. In some embodiments of the present invention, the program code obtains the values at a rate of two readings per day (allowing a battery to last up to six months).

In some embodiments of the present invention, the transmitter 150 is built into the programmable circuit board 130. For example, some embodiments of the present invention utilize an Adafuit Feather 32u4 Radio with a RFM69HCW module, as the programmable circuit board 130. In this embodiment, the transmitter 150, which is a radio transmitter, is integrated into the programmable circuit board 130. In this non-limiting embodiment, the transmitter 150 is a four hundred and thirty-three (433) MHz radio transmitter.

Figure 4:
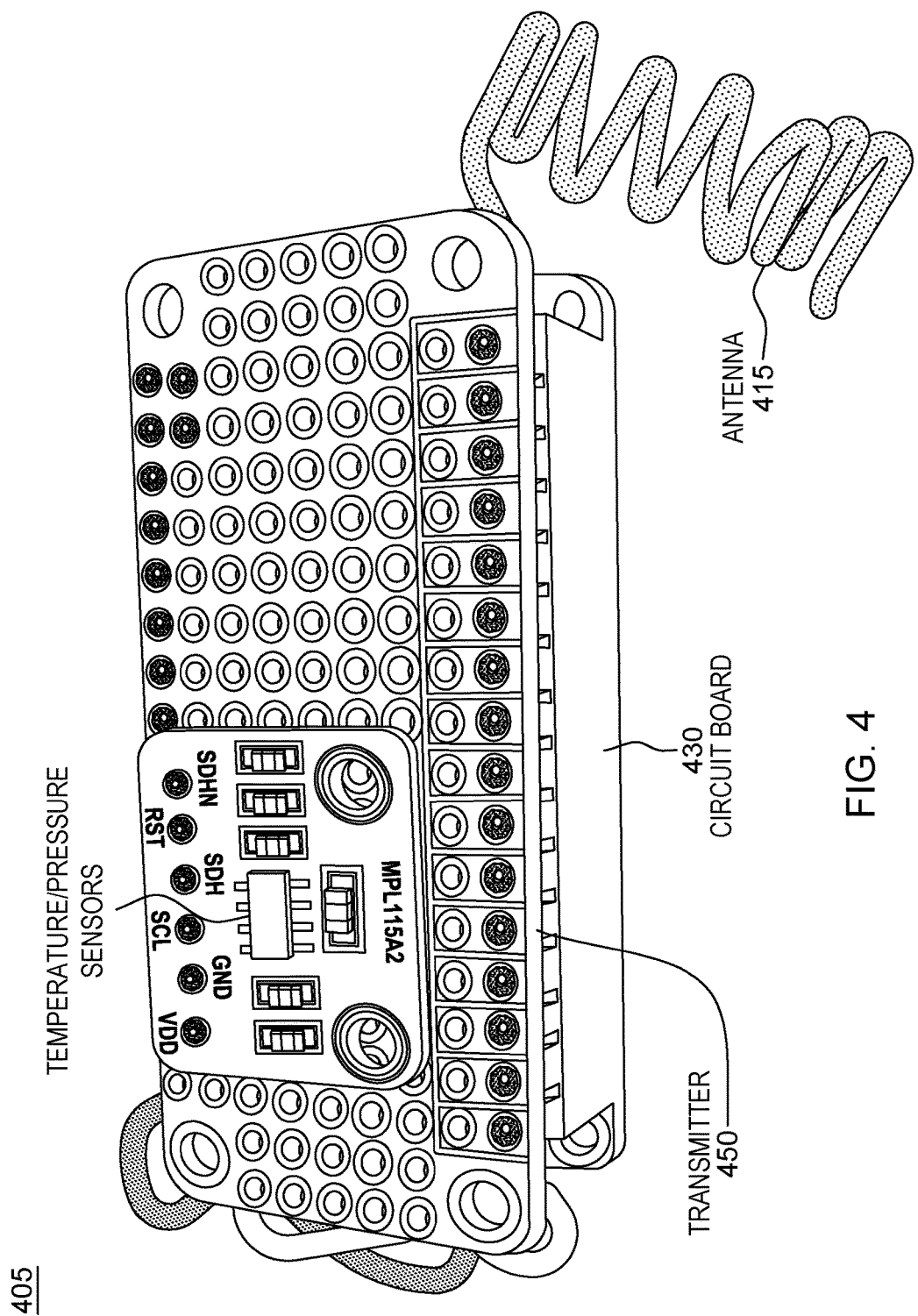
FIG. 4 depicts certain aspects of an embodiment of the present invention

FIG. 4 is an illustration of an embodiment of the present invention, depicting certain aspects of the closed vessel monitoring device 100 (FIG. 1), specifically monitoring unit 405, which includes the transmitter 450, which is integrated into the programmable circuit board 430. The monitoring unit 105 is comprised of a programmable circuit board 430, a pressure measuring unit 410, a temperature sensing unit 440, and an antenna 415. In the embodiment of FIG. 4, a pressure measuring unit 410 and a temperature sensing unit 440, are sensors that are coupled to the programmable circuit board 430, and an antenna 415, together creating a transmitter 450. In some embodiments of the present invention, the transmitter 450 is comprised of certain hardware on the programmable circuit board 430.

Returning to FIG. 1, in some embodiments of the present invention, the monitoring unit 105 comprises one or more antennas and the power source 170 comprises one or more batteries (e.g., lithium ion batteries). In some embodiments of the present invention, the programmable circuit board 130, the transmitter 150, the power source 170, the temperature sensing unit 140 (or a combined pressure measuring unit 110 and temperature sensing unit 140), and the antenna 115, are resident inside an enclosure 180, comprising the monitoring unit 105. In some embodiments of the present invention, the enclosure is comprised of a moisture resistant material that is both USDA and FDA compliant. In one embodiment, the enclosure 180 is milled out of (e.g., white) Delrin acetal resin. A gasket on the top of the enclosure 180 can be made of natural rubber which is also FDA compliant for use with food. The enclosure can be milled on a CNC machine to ensure that the tolerances achieved allow it to seal properly and hold pressure. In some embodiments of the present invention, hardware used to secure the enclosure 180 and to secure the electronic components into the enclosure (e.g., screws and connection to coupler) are stainless steel. In some embodiment of the present invention, there is a vapor barrier on the inside of the enclosure 180 made of Gore-tex, which allows air pressure to pass to the electronics to be measured (e.g., by the pressure measuring unit 110), but does not allow liquid to come into contact with electronics.

Figure 5:
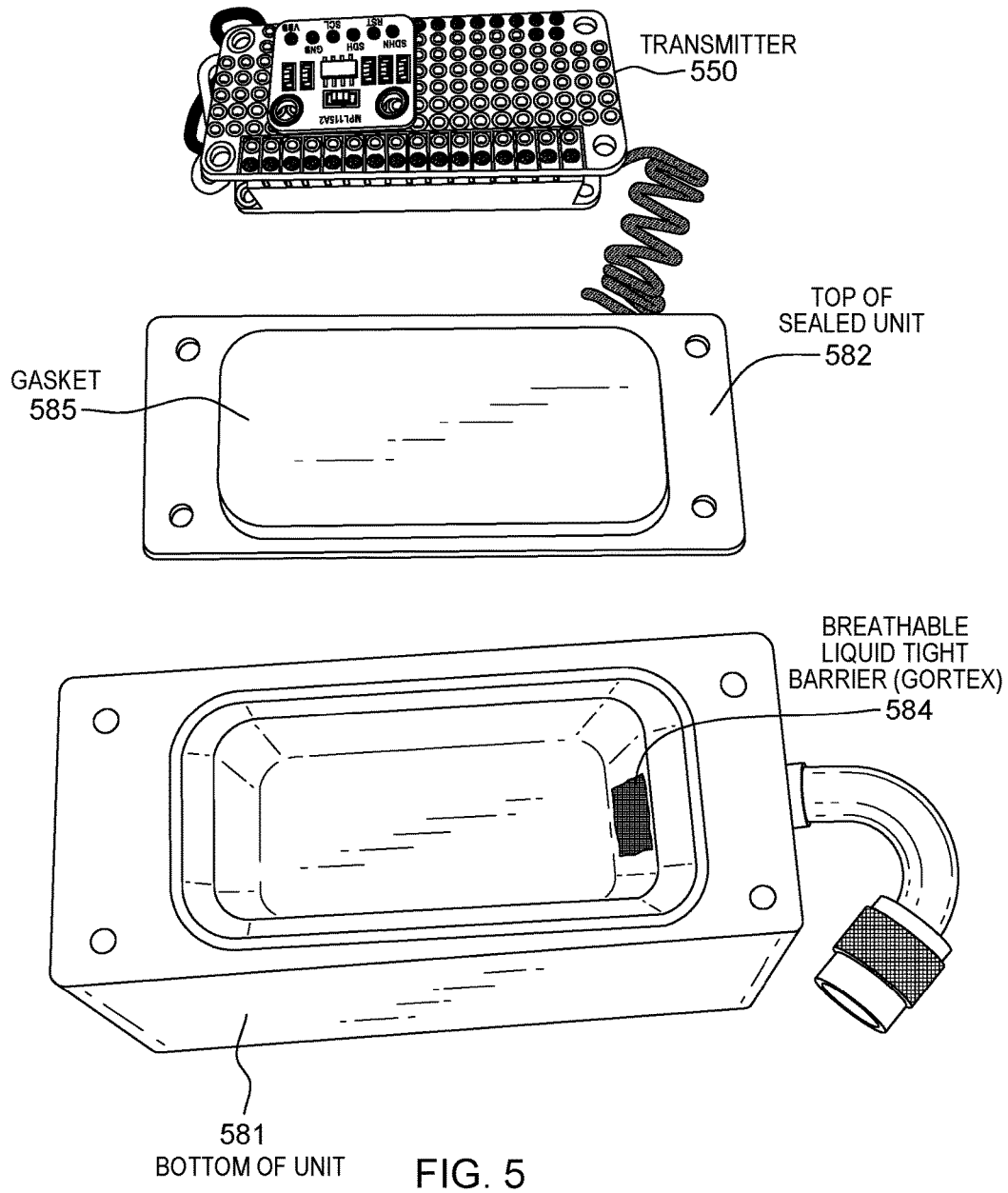
FIG. 5 depicts certain aspects of an embodiment of the present invention
Figure 6:
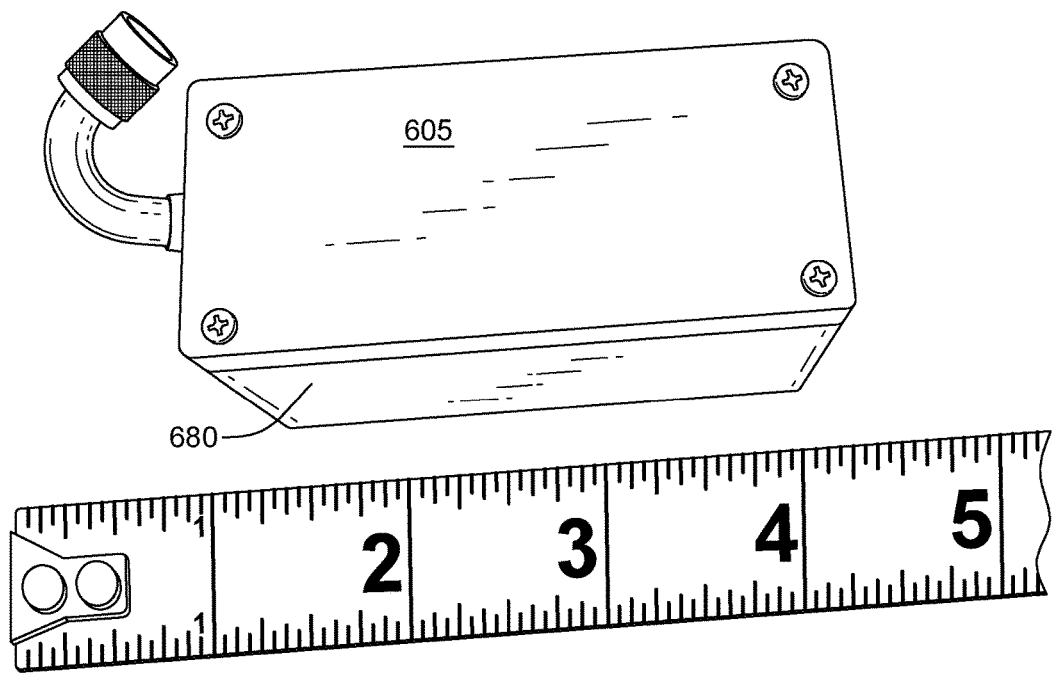
FIG. 6 depicts certain aspects of an embodiment of the present invention

FIG. 5 and FIG. 6 both depict the monitoring unit 505 605 portion of embodiments of the present invention. FIG. 5 depicts a broken out view of all the components of the monitoring unit 500, including the transmitter 550 and the enclosure 580. The enclosure 580 is depicted open, such that the transmitter 550 has not yet been placed and sealed into the enclosure 580. FIG. 5 also depicts a non-limiting example of a gasket 585 on the top 582 of the enclosure 580. FIG. 5 illustrates a vapor barrier 584, which is breathable and liquid tight, on the bottom 581 of the enclosure 580. FIG. 6 depicts the monitoring unit 605 sealed, such that the electronics are not visible. FIG. 6 depicts an example of an enclosure 680 of a small size (~2 inches) in order to accommodate the keg and connectors to the keg.

Figure 9:
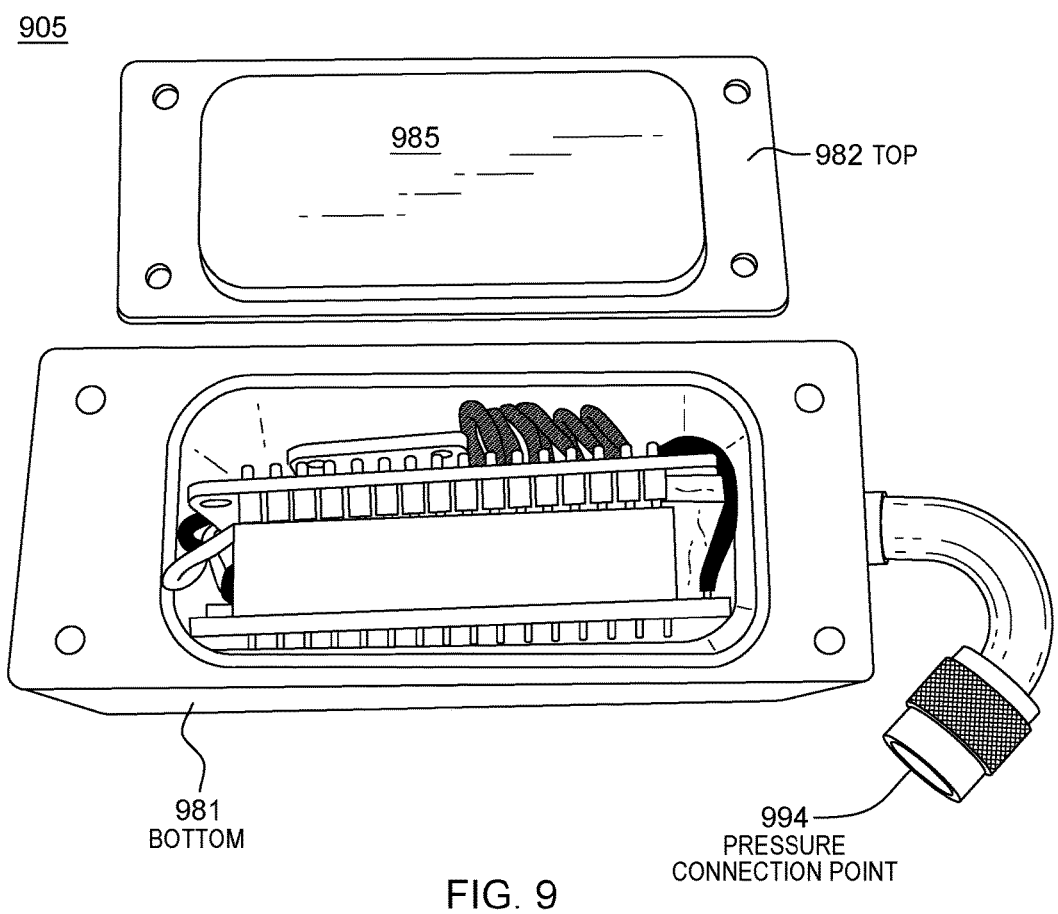
FIG. 9 depicts certain aspects of an embodiment of the present invention.

FIG. 9 depicts a partial assembly of the monitoring unit 905, in accordance with some embodiments of the present invention. The top of the unit 982 has not been placed over the bottom of the unit 981, which holds the transmitter 950. The gasket 985 is also visible from this view and the pressure connection point 994, where the monitoring unit 905 connects to the connection components 104 (FIG. 1), and, ultimately, to the vessel 120 (FIG. 1).

In some embodiments of the present invention, the pressure measuring unit 110 and/or the temperature sensing unit 140 are communicatively couple the programmable circuit board 130, by soldering connections from the temperature sensing unit 140 and the pressure measuring unit 110 to the programmable circuit board 130. In some embodiments of the present invention, the temperature sensing unit 140 and the pressure measuring unit 110 utilized are a MPL115A2, manufactured by Freescale. Values from the temperature sensing unit 140 and the pressure measuring unit 110 are transmitted by program code executing on the programmable circuit board 130, via the transmitter 150, to a centralized computing resource 190. Various temperature and pressure sensing devices (of the present invention) may transmit these measured values to the centralized computing resource 190.

In some embodiments of the present invention, the data is received by the centralized computing resource 190, from the transmitter 150, via the receiver 160, over a wireless communication channel. The data from the closed vessel monitoring system of the present invention may transmit data for receipt by a radio module comprising a receiver 160 of the centralized computing resource 190. The receiver can receive the transmission as a 433 MHz signal. In an embodiment of the present invention, the receiver 160, e.g., radio module, is connected to a USB serial port of the centralized computing resource 190.

In some embodiments of the present invention, the receiver 160 includes a pressure device, which subtracts out barometric pressure as a check to verify that the pressure data received is reasonable. In some embodiments of the present invention, program code executing at a receiver 160 can verify the barometric pressure utilizing a pressure sensor 167 located at the receiver 160 that is open to the atmosphere. In some embodiments of the present invention, the receiver 160 comprises a wireless module to enable its communication over a network. The receiver 160 can communicate wirelessly with a centralized computing resource 190 rather than being physically coupled to the centralized computing resource 190. The receiver 160 may comprise a power source, such as a battery, or may be plugged into a source at a location where it is convenient to transmit data via wireless connection to the centralized computing resource 190.

In some embodiments of the present invention, the program code executed by the programmable circuit board 130 receives the data from the temperature sensing unit 140 and the pressure measuring unit 110, transmits the data to the receiver, and the receiver and dumps the data collect into a string along with signal strength, to the serial port of the centralized computing resource 190. Upon receipt of the data by the centralized computing resource, one or more processors of the centralized computing resource 190 read the data into a memory resource, including, but not limited to supervisory control and data acquisition system (SCADA) 192 and/or a database 195.

Figure 10:
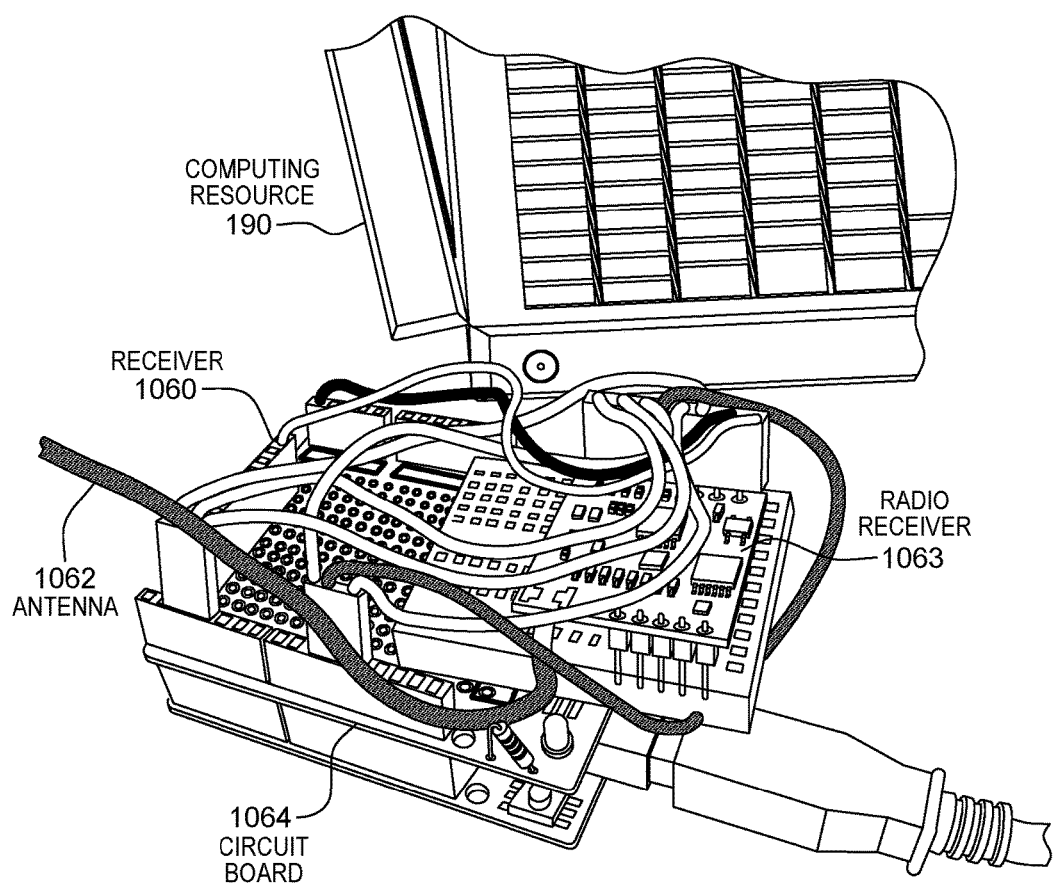
FIG. 10 depicts certain aspects of an embodiment of the present invention.

FIG. 10 is an example of a receiver 1060 that may be utilized in some embodiments of the present invention. In FIG. 10, the receiver 1060 is communicating with a centralized computing resource 1090 via a wireless connection. The receiver 1060 includes an antenna 1062, a circuit board 1064 executing program code to obtain the sensor data from the transmitter 150 (FIG. 1) and to subtract out barometric pressure to verify that the data received is reasonable. The receiver 1060 also include a radio receiver 1063, which serves as the aforementioned wireless module to enable the receiver 1060 to communicate over a wireless network.

Figure 11:
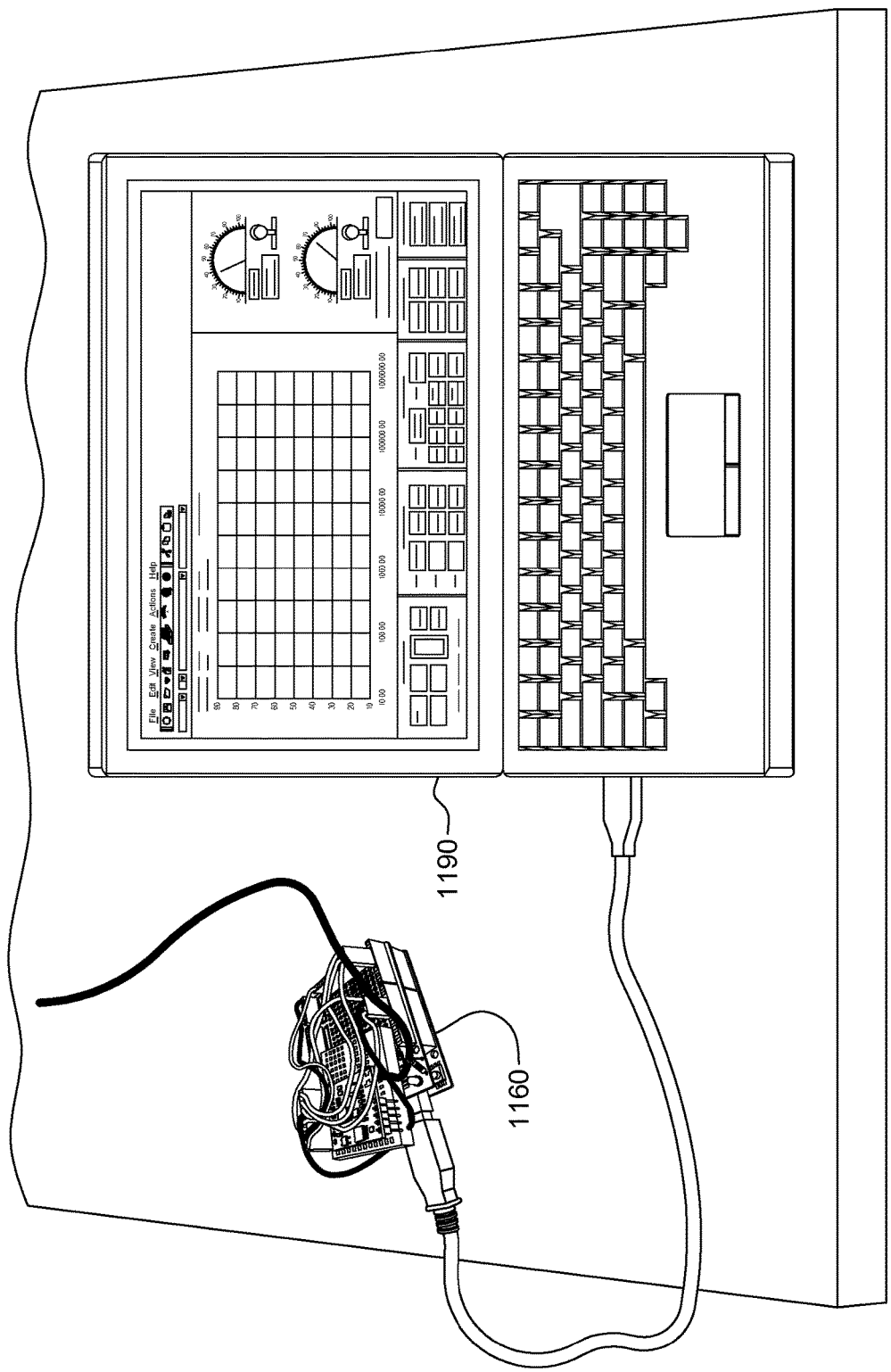
FIG. 11 depicts certain aspects of an embodiment of the present invention.

In some embodiments of the present invention, if a database 195 is not available to accept and store the data, the processor(s) saves the data into a SCADA 192. Among the advantages of storing the data in a SCADA 192 is that a SCADA 192 enables a user to graph data and save csv files of the data, if needed. FIG. 11 depicts a receiver 1160 in some embodiments of the present invention, plotting data to a centralized computing resource 1190.

Returning to FIG. 1, by storing the data in a database 195, the processor(s) can log the data and assign various triggers to the data, which alert the user when the data indicates various events (e.g., meets certain thresholds). In some embodiments of the present invention, triggers are based on carbon dioxide levels reported by each device, as identified based on the unique identifiers associated with the data from each device (as each device is assigned to a vessel). The varying values assigned to trigger each device can be dependent on the beer type or style in the vessel monitored by the respective device. In addition to utilizing triggers based on the content of the data stored in the database 195, in some embodiments of the present invention, the battery life and/or signal strength of the devices can trigger alerts to the user that maintenance is needed. The program code of a given device may transmit data related to the battery life of its power source and/or the processor(s) of the centralized computing resource 190 may detect a signal strength below a given threshold. In either of these events, the processor(s) may trigger an alert to a user. The alerts may be text messages, emails, alarms, content displayed in a graphical user interface of a client device communicatively couple to the centralized computing resource 190, etc.

By retaining historical data in a database 195 or other memory resource, the processor(s) of the centralized computing resource 190 may machine learn, based on analyzing historical data. For example, the processor(s) can log temporary temperature data against speed of fermentation data, which a user (brewer) or the program code of a given device may utilize to streamline secondary conditioning.

Figure 2:
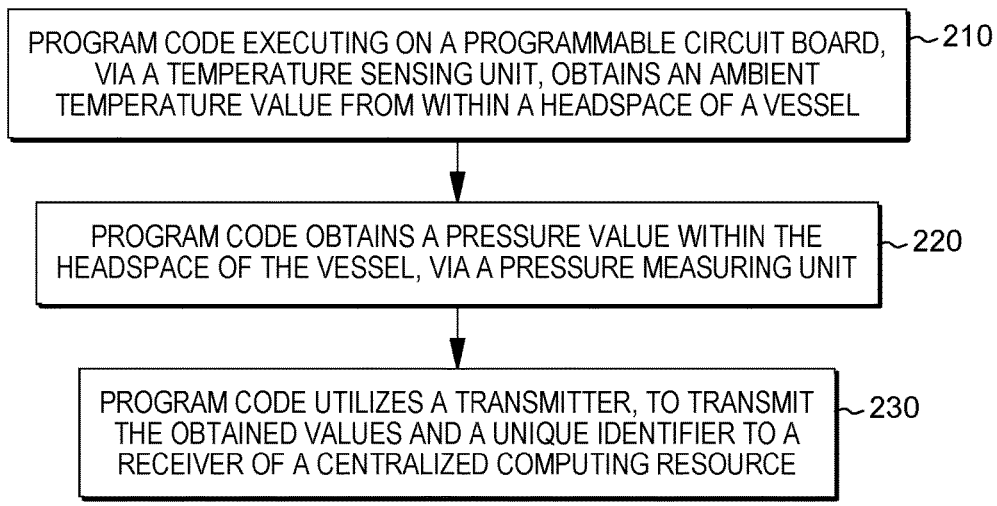
FIG. 2 is a workflow illustrating various aspects of some embodiments of the present invention.

FIG. 2 is a workflow 200 that illustrates various aspects of a method of some embodiments of the present invention. Various aspects of FIG. 1 are referred to in FIG. 2 by way of clearly illustrating the workflow 200. In an embodiment of the present invention, the ambient an temperature value within a headspace of a vessel 110, is obtained by program code executing on a programmable circuit board 130 via a temperature sensing unit 140 (210). The program code obtains a pressure value within the headspace of the vessel 120, via a pressure measuring unit 110 (220). The pressure and temperature values may both be received at predetermined intervals. In some embodiments of the present invention, the program code obtains a barometric pressure value, which the program code converts to a pressure value by calibrating a barometric pressure sensor comprising the pressure measuring unit 110 by subtracting off barometric pressure (~100 KPA). As will be discussed in conjunction with FIG. 10, in some embodiments of the present invention, program code executing at a receiver 160 can verify the barometric pressure utilizing a pressure sensor 167 located at the receiver 160 that is open to the atmosphere.

The program code utilizes a transmitter 150, to transmit the obtained values and a unique identifier to a receiver 160 of a centralized computing resource 190 (230). In some embodiments of the present invention, in addition to the unique identifier, the values transmitted to the centralized computing resource 190 include a temperature (e.g., in degrees Celsius), a pressure (e.g., Bar), and a carbonation level (e.g., g/L). The unique identifier can be the unit ID number and the voltage of the power source 170. In some embodiments of the present invention, the program code embeds an encryption key into the transmission, the encryption key is utilized by the centralized computing resource 190 to validate that the data received in from the correct source.

FIG. 7 and FIG. 8 depict embodiments of the closed vessel monitoring system 700 800 of the present invention, coupled, respectively, to a sanke keg 720 and a modified keg 820. In FIG. 7 the closed vessel monitoring system includes the monitoring unit 705, which encases the previously discussed electronics, and a sanke keg coupler 706 and a Schrader valve 709 coupling the monitoring unit 705 to the vessel 720, the sanke keg. In FIG. 8, a Schrader valve 809 also coupled the monitoring unit 805 to the vessel 820, the modified keg.

Figure 12:
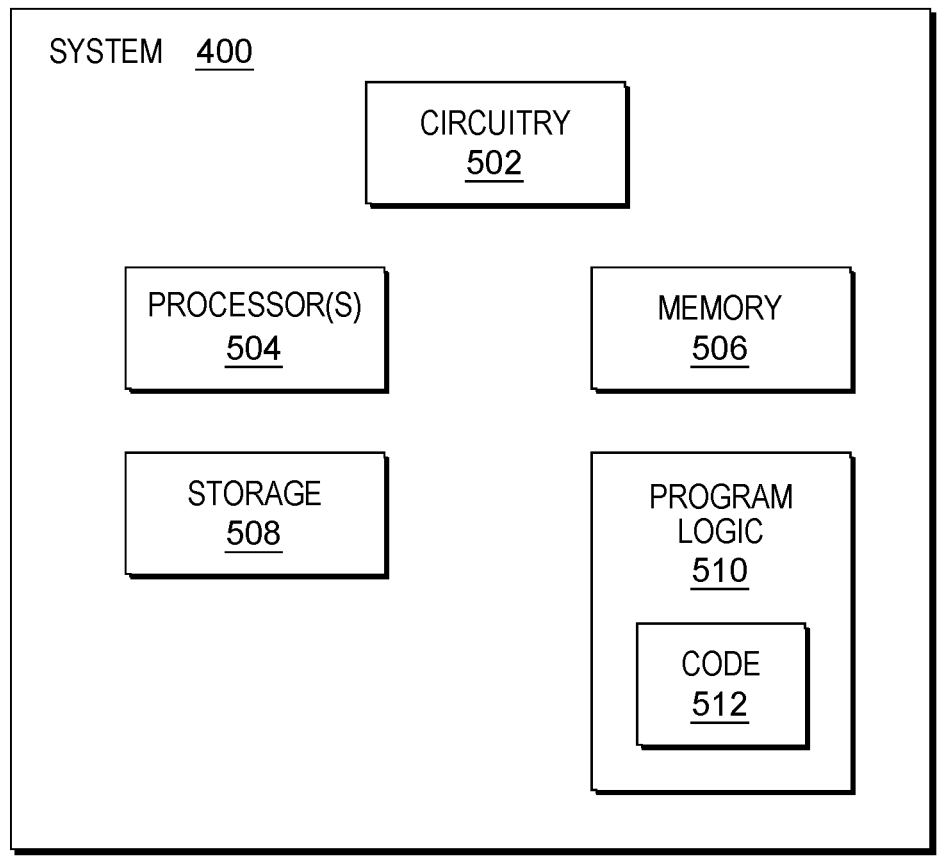
FIG. 12 depicts a computer system configured to perform an aspect of an embodiment of the present invention.

FIG. 12 illustrates a block diagram of a resource 400 in computer system, such as, which is part of the technical architecture of certain embodiments of the technique. Returning to FIG. 12, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 12 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 13:
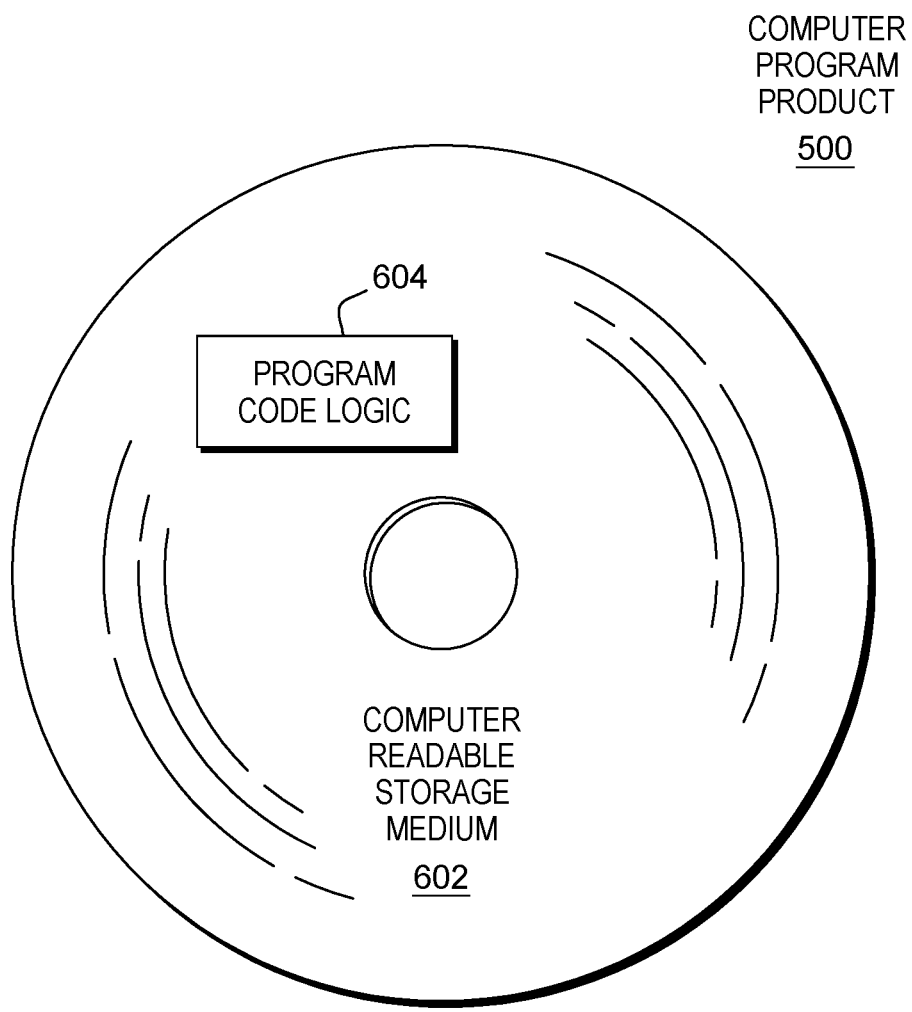
FIG. 13 depicts a computer program product incorporating one or more aspects of the present invention.

Using the processing resources of a resource 400 to execute software, computer-readable code or instructions, does not limit where this code can be stored. Referring to FIG. 13, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A monitoring device, comprising:
   connection valve components coupling a temperature sensor and a pressure sensor to a closed vessel, wherein the temperature sensor measures a temperature value and the pressure sensor measures a pressure value within head space of the closed vessel, wherein a fermenting liquid is stored in the closed vessel wherein the fermenting liquid comprises a naturally carbonated beverage in that a natural refermentation occurs inside the closed vessel;
   a closed vessel monitoring device coupled to the connection valve components, the closed vessel monitoring device comprising the temperature sensor and the pressure sensor, wherein the temperature sensor and the pressure sensor are coupled to a programmable circuit board comprising a transmitter, wherein the programmable circuit board stores instructions for execution by a processing circuit of the programmable circuit board, for performing a method comprising:
   obtaining, by the processing circuit, from the temperature sensor, via the connection valve components, the temperature value;
   obtaining, by the processing circuit, from the pressure sensor, via the connection valve components, the pressure value;
   transmitting, by the processing circuit, over a wireless communications connection, the temperature value and the pressure value to a receiver communicatively coupled to a computing resource;
   determining, by the processing circuit, based on the temperature value and the pressure values, a carbonation level for the fermenting liquid; and
   transmitting, by the processing circuit, over the wireless communications connection, the carbonation level.

2. The monitoring device of claim 1, further comprising a power source communicatively coupled to the programmable circuit board, wherein the power source provides power to the transmitter.

3. The monitoring device of claim 2, wherein the receiver is coupled to the computing resource via a wired connection to a serial port of the computing resource.

4. The monitoring device of claim 3, wherein the transmitting further comprises:
   transmitting, by the processing circuit, a signal strength of the transmitter to the receiver.

5. The monitoring device of claim 4, wherein the computing resource generates an alert responsive to obtaining a value selected from the group consisting of: the temperature value, the pressure value, the carbonation level, and the signal strength.

6. The monitoring device of claim 5, wherein the alert is responsive a condition selected from the group consisting of: a carbon dioxide level indicating that a secondary fermentation is complete, the carbon dioxide level indicating that the fermenting liquid is over-carbonated, and the signal strength indicating that the power source is below a predetermined threshold for usability within the closed vessel monitoring device.

7. The monitoring device of claim 1, wherein the closed vessel comprises a keg.

8. The monitoring device of claim 7, wherein the naturally carbonated beverage comprises beer.

9. The monitoring device of claim 1, wherein the closed vessel monitoring device unit coupled to the connection valve components at a pressure connection point.

10. The monitoring device of claim 1, the connection valve components comprising a sanke coupler couples to a threaded one-way valve, the closed vessel comprising a sanke keg.

11. The monitoring device of claim 1, the connection valve components comprising a threaded one-way valve, the closed vessel comprising a modified keg.

12. The monitoring device of claim 1, the closed vessel monitoring device further comprising an antenna coupled to the programmable circuit board.

13. The monitoring device of claim 1, the closed vessel monitoring device further comprising a casing, wherein the temperature sensor, the pressure sensor, and the programmable circuit board are sealed inside the casing, the casing comprising a bottom portion and a top portion.

14. The monitoring device of claim 13, the bottom portion comprising a pressure connection point to couple the casing to the connection valve components and a cavity to accommodate the temperature sensor, the pressure sensor, and the programmable circuit board, wherein the top portion forms a lid, sealing the cavity, when the casing is sealed.

15. The monitoring device of claim 14, the bottom portion further comprising a breathable liquid tight barrier adjacent to the pressure connection point.

16. The monitoring device of claim 14, the top portion comprising a gasket, the gasket being oriented inside the cavity when the casing is sealed.

17. A method of monitoring carbonation in a closed vessel storing a fermenting liquid, comprising:
   utilizing a processing circuit of a monitoring device to determine carbonation levels of the fermenting liquid in the closed vessel, wherein the fermenting liquid comprises a naturally carbonated beverage in that a natural refermentation occurs inside the closed vessel, the monitoring device comprising:

connection valve components coupling a temperature sensor and a pressure sensor to the closed vessel, wherein the temperature sensor measures a temperature value and the pressure sensor measures a pressure value within head space of the closed vessel;

a closed vessel monitoring device coupled to the connection valve components, the closed vessel monitoring device comprising the temperature sensor and the pressure sensor, wherein the temperature sensor and the pressure sensor are coupled to a programmable circuit board comprising a transmitter, wherein the programmable circuit board stores instructions for execution by the processing circuit of the programmable circuit board of the monitoring device, for performing a method comprising:

obtaining, by the processing circuit, from the temperature sensor, via the connection valve components, the temperature value;

obtaining, by the processing circuit, from the pressure sensor, via the connection valve components, the pressure value; and transmitting, by the processing circuit, over a wireless communications connection, the temperature value and the pressure value to a receiver communicatively coupled to a computing resource;

determining, by the processing circuit, based on the temperature value and the pressure values, a carbonation level of the carbonation levels for the fermenting liquid; and transmitting, by the processing circuit, over the wireless communications connection, the carbonation level.

18. The method of claim 17, further comprising:

transmitting, by the processing circuit, a signal strength of the transmitter to the receiver, wherein the computing resource generates an alert responsive to obtaining a value selected from the group consisting of: the temperature value, the pressure value, the carbonation level, and the signal strength.

* * * * *

UNITED STATES PATENT AND TRADEMARK OFFICE
CERTIFICATE OF CORRECTION

PATENT NO. : 10,506,308 B1
APPLICATION NO. : 16/052225
DATED : December 10, 2019
INVENTOR(S) : Neidhart et al.

Page 1 of 1

It is certified that error appears in the above-identified patent and that said Letters Patent is hereby corrected as shown below:

In the Claims

Column 14, Line 31: Claim 9, Delete "device unit coupled" and insert -- device coupled --

Signed and Sealed this
Fourth Day of February, 2020

Andrei Iancu
*Director of the United States Patent and Trademark Office*